United States Patent [19]

Bieri

[11] Patent Number: 4,923,344
[45] Date of Patent: May 8, 1990

[54] COUPLING SYSTEM FOR BORING TOOLS

[75] Inventor: Hans Bieri, Pfäffikon, Switzerland

[73] Assignee: Hydrostress AG, Pfaffikon, Switzerland

[21] Appl. No.: 280,380

[22] Filed: Dec. 5, 1988

[30] Foreign Application Priority Data

Dec. 5, 1987 [CH] Switzerland .......................... 4748/87

[51] Int. Cl.⁵ .......................... B23C 9/00; F16B 7/20
[52] U.S. Cl. .................................... 409/234; 279/16; 403/342; 408/239 A
[58] Field of Search .............. 409/234, 237; 279/1 A, 279/16, 91; 408/204, 239 R, 239 A; 403/335, 338, 342, 349

[56] References Cited

U.S. PATENT DOCUMENTS

| | | | |
|---|---|---|---|
| 2,767,564 | 10/1956 | Green | 279/16 X |
| 2,898,118 | 8/1959 | Smith | 279/16 |
| 3,162,457 | 12/1964 | Jacco | 403/342 X |
| 3,364,798 | 1/1968 | Girardin | 279/16 |
| 3,736,011 | 5/1973 | Ward | 403/342 X |
| 3,835,666 | 9/1974 | Hoffman | 279/16 X |
| 4,655,630 | 4/1987 | Rinehart | 403/342 |

FOREIGN PATENT DOCUMENTS

| | | | |
|---|---|---|---|
| 457053 | 7/1968 | Switzerland | 403/342 |
| 833802 | 4/1960 | United Kingdom | 403/342 |

Primary Examiner—William Briggs
Attorney, Agent, or Firm—Frishauf, Holtz, Goodman & Woodward

[57] ABSTRACT

To permit easy coupling and uncoupling of a concrete or rock circular boring or milling tool element (14, 17), two coupling parts (1, 2) are provided, a first coupling part (1) being formed with a recess (7) of non-circular cross-sectional shape, for example of approximate four-leaf clover shape, extending inwardly from an end face (11) of the first part; the second part (2) has a projection (20) of non-circular cross-sectional shape, matching the cross-sectional shape of the recess, and fitting therein, while being axially separable therefrom. The engagement surfaces (a, 22) of the respective first and second parts extend axially of the coupling elements. A retaining nut (3) retains the parts against each other. For centering of the parts, prior to assembly, interengaging matching centering arrangements are provided, for example by a circular ring cut into the first part ahead of the recess, the projections of the second part extending to just about the circumference of the ring to permit fitting the first and second parts together before the projection is angularly aligned with the recess to permit slipping the projection into the recess while having been preliminarily centered with respect thereto.

16 Claims, 3 Drawing Sheets

COUPLING SYSTEM FOR BORING TOOLS

The present invention relates to a coupling arrangement or coupling system to couple a rotating drive element, releasably, to a circular boring or milling tool, particularly adapted for cutting into concrete or rock, and especially for coupling hollow circular cutting tools of substantial size, for example up to about one-half meter in diameter, and capable of transferring high drive power, in the order of for example about 10 kW.

BACKGROUND

Circular boring or milling tools of large diameter and operating under high power are used, for example, to make circular openings in concrete walls, rock faces or the like. Couplers are usually used to couple the drive shaft of a drive apparatus to the tools themselves. A problem arises with such couplers that transfer of the high power and high torque between releasable elements is difficult since the driving and driven elements of the couplers have a tendency to freeze or jam together so that replacement of the cutter tool by another one, for example with fresh cutting elements thereon, or of a different size, becomes difficult. Release of such couplers, thus, causes problems which cannot be readily solved. Forces necessary to release such couplers may lead to a deformation of the usually internally hollow or cylindrical cutting tools, rendering them useless for sharpening or further use. Interchange of cutters, when the parts have frozen or jammed together, is time-consuming and difficult, particularly when the coupling must be loosened on a job, remote from a shop; further, specialty tools to effect release are frequently not available at job sites where the cutters are to be used.

The couplers must meet another requirement, namely that they can be easily reassembled. One of the coupling elements, for example the one coupled to a driving machine or motor, is frequently fixedly secured to the drive shaft of the machine. The coupling element attached to the cutting tool, however, is portable. To assemble the cutting tool with its coupler part on the coupler of the drive machine must be so simple that experimentation and search for an appropriate seating position is simple. The association of the releasable tool element from the drive shaft, both with respect to angular as well as axial position, must therefore be simple and positive, without requiring special steps or procedures to match the respective coupling elements together. The system should, further, be so simple that it can be operated even by only marginally skilled personnel who may be good stoneworkers, but poor machine mechanics.

THE INVENTION

It is an object to provide a coupling arrangement or coupling system, particularly suitable for transfer of high torques and high power, which is readily releasable and especially adapted to transfer torques to large, hollow circular cutting tools or cutting mills which are cylindrical, and hence subject to deformation, without, however, causing any deformation upon assembly of the tool to a drive shaft, or separation of the tool from the drive shaft. Additionally, the couplers should be axially short and permit rapid assembly and disassembly without requiring additional special engagement tools.

Briefly, a first coupling part is fixedly secured to a drive element, for example the drive shaft of a motor; a second coupling part is secured to the driven element, for example the cutting or boring tool. The first coupling part is formed with a non-circular recess, which extends inwardly from an end face facing the second part, when assembled therewith; the second coupling part is formed with a projection of non-circular cross section, matching the cross-sectional shape of the recess, to fit therein, while being axially separable therefrom, and extending from an end face of the second coupling part facing the aforementioned end face of the first coupling part. The first and second coupling parts further include an interengaging matching centering structure to define a mutually axially, at least approximately aligned position of the two parts with respect to each other, the centering arrangement being positioned at the axially facing surfaces of the parts to provide for relative centering of the parts before the projecting portion engages into the recess, upon axial relative movement of the two parts. The two parts are held in axially fixed position by a retaining coupling nut.

Torque is transferred by the axially interengaged elements, the coupling nut merely holding the parts in engaged position, without in any way contributing to the transfer of torque. Thus, upon release of the coupling nut, the two parts can easily be severed from each other.

Couplers which transfer rotary torque frequently have the difficulty that the coupling parts must have specifically assigned rotary or angular positions with respect to each other before they can be fitted together. In accordance with a feature of the invention, therefore, the centering arrangement is provided which is positioned in advance of the region where the projection and the recess interengage, so that the parts can be first axially aligned with respect to each other, preliminarily engaged and, only then, relatively rotated until the interengaging fit position is found at which the final axial engagement of the elements takes place, permitting the transfer of rotary power and torque between the two coupling parts. The structure results in a short coupling element capable of transferring substantial torques. The short axial length contributes to ease of exchange of the circular cutting tool, for example.

The coupling arrangement or system readily permits forming the respective coupling parts with central through-openings so that cooling liquid can be supplied to the milling cutting element.

Drawings illustrating an example:

DETAILED DESCRIPTION

Figure 1:
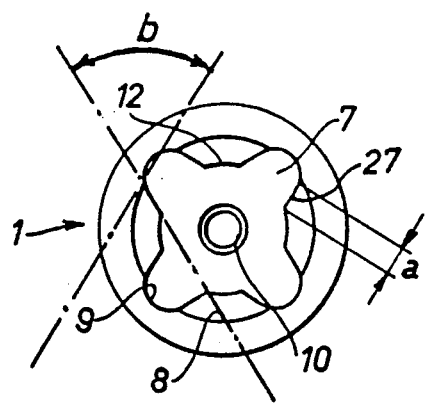
FIG. 1 is a top view of the coupling part to be coupled to the driving element.

The coupling system is used for releasable connection of a rock boring or milling tool 14 (FIG. 6) for boring or drilling holes into concrete plates, slabs, and the like, into rock, or for other working of rocks or concrete. A rotatable shaft 13 (FIG. 1) provides drive power to an upper or first coupling part 1, which is to be coupled to a lower or second coupling part 2. Coupling part 2, in turn, is connected to the boring or milling tool 14. The first or upper coupling part 1 has a projecting or bolt portion 4. The portion 4 is externally thread, of plug or threaded bolt shape, and projects from an upper face 5 which can engage against the lower end face of the spindle or shaft 28.

In accordance with a feature of the invention, the upper part 1 is formed, at the bottom, with a recess 7 which 5 is best seen in FIG. 1, and which has a shape which is other than circular and of a contour preferably essentially star or cross-shaped or four-leaf-clover-shaped. This contour permits acceptance of a matching projection of the lower coupling part 2. The specific contour of the recess 7 is formed by an essentially circular recess portion 12 (FIG. 2) and radially projecting, essentially semi-circular recess portions 9, extending from the central circular portion 12. The transition zones between the central recess portion 12 and the radially extending portions 9 form the engaging or force or torque transfer surfaces a, as seen in FIG. 1, adapted to be engaged by matching surfaces 22 (FIG. 4) of the projection 20 of the lower part 2.

Figure 2:
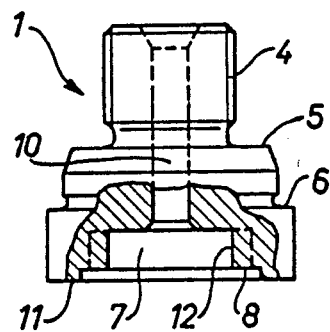
FIG. 2 is a side view, partly broken away, of the upper coupling part.

In accordance with another feature of the invention, the lower facing surface 11 of the upper part 1 is formed with a coaxial—with respect to the longitudinal axis of the part 1—circular centering recess 8. The centering recess 8 is shallow, and, as can be seen in FIG. 2, substantially less deep than the depth of the recess 7.

Figure 6:
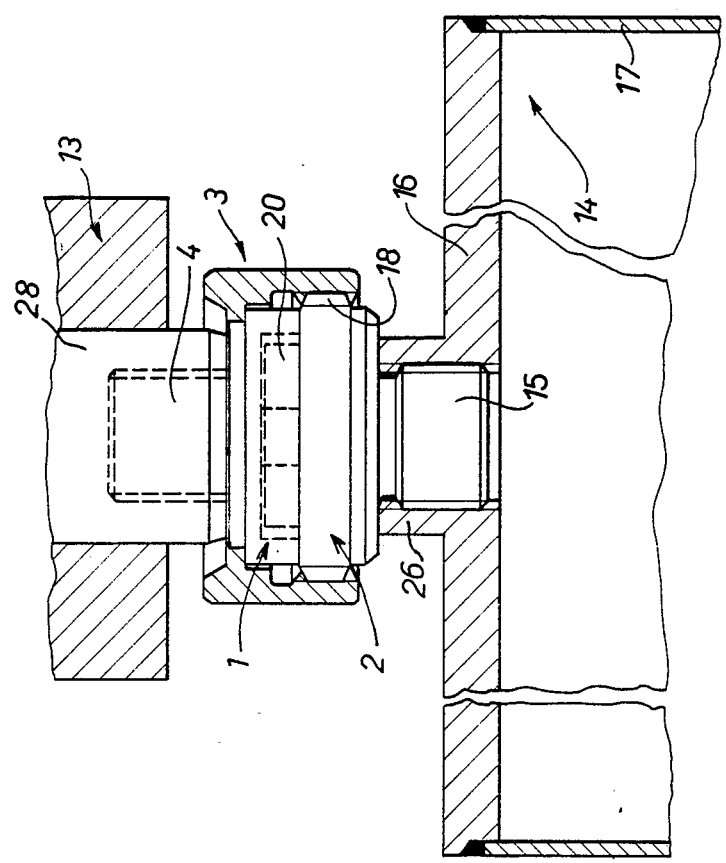
FIG. 6 is an axial part-sectional view of the coupling in assembled condition, for coupling an output drive shaft to a boring or milling tool.

Although not absolutely necessary but desirable, a central through-bore 10 is formed in the part 1 to permit cooling liquid, for example water, to be directed in the interior of the hollow cutting tool 14 (FIG. 6).

Figure 3:
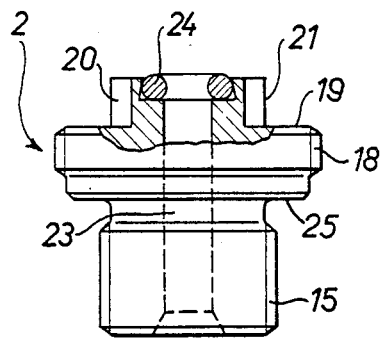
FIG. 3 is a side view, partly cut away, of the lower coupling part.

The second or lower coupling part 2 (see FIGS. 3, 4 and 6) is intended for connection to the cylindrical hollow cutting tool or milling cutter 14. The lowermost portion is bolt-like, as seen at 15, and formed with an external thread for threading into the flange 16 (FIG. 6) of the cutting tool 14, until the end face 25 of a shoulder on the lower part 2 engages a collar 26 (FIG. 6) formed on the flange 16 of the cutting tool. The region of the coupling upwardly from the threaded bolt extension 15 is formed as an axially short cylindrical ring with an outer thread 18. Thread 18 need not be extensive, for example having only three thread turns thereon. The adjacent region, extending upwardly, is formed as a coupling projection 20 which is shaped to fit into the recess 7, so that, respectively, the projection 20 and the recess 7 are complementary with respect to each other. The coupling projection 20 is essentially star or cross-shaped, having four radially projecting legs which, at the end, terminate in circular surfaces, forming the generation surfaces which are circular-cylindrical, as seen at 21 in FIG. 4. The region 22 between the respective radial cross-shaped projections is rounded and of part-circular form or shape. The diameter of the circle forming the cylindrical surfaces 21 of the cross elements 20 is just slightly smaller than the diameter of the centering recess 8 in the first coupling part 1, to facilitate centering of the parts with respect to each other upon mutual engagement.

ASSEMBLY, AND COUPLING PARTS

The two parts 1, 2 are assembled by first positioning parts 1 and 2 in approximately axial alignment and then engaging the projection 20 into the centering recess 8, in any randomly arranged mutual angular position. Engaging the surfaces 21 of the coupling part 2 in the centering recess 8 aligns the parts, at least approximately, centered with respect to each other and readily permits relative rotation of the two coupling parts 1, 2 until the cross portion 20 is in angularly matching position with the complementary recess portions 9 of the part 1, so that the two parts can be fitted together by axial relative shifting, permitting accurate matching of the engagement surfaces with practically no play or clearance. As soon as the parts are fitted within each other, the lateral surfaces 22 of the cross elements 20 engage against the region a (FIG. 1) of the recess 7, 9, 12 in the first part 1, to provide a high torque transfer connection between the parts 1 and 2.

The surfaces 22 of the cross elements 20 extend at right angles to the surface 19 (FIG. 3), that is, axially with respect to the coupling parts 2. Likewise, the walls of the recess 7 and the portion a thereof extend axially.

A through-bore 23 is preferably formed centrally in the coupling part 2, which has a sealing ring 24 fitted at the end thereof which, in disassembled position, slightly extends over the end face of the projection 20.

The coupling parts 1, 2 thus are interengaged by pure axial relative movement; separation of the coupling parts, likewise, is entirely axially. The coupling nut 3, slipped over parts 1 and 2 as best seen in FIG. 6, is used only to hold the two coupling parts 1 and 2 together, so that they cannot be axially separated. The coupling nut 3 does not have any power or torque transmitting function. When the coupling nut 3 is threaded over the short threaded portion 18, it provides for engagement of the inner ring surface 31 (FIG. 5) against the shoulders 5 or 6, thus pulling the two coupling parts 1, 2 axially into each other until the surfaces 19 (FIGS. 3, 4) on coupling part 2, and 11 (FIG. 2) on coupling part 1 engage against each other

DISASSEMBLY OF THE COUPLING

The coupling nut 3 has a polygonal outer surface, preferably in form of a hexagon. Thus, even after high torque transfer between the drive element 13 and the tool 14, the nut can be easily loosened. To disassemble or separate the coupling, the nut 3 is threaded upwardly until the thread 18 is out of engagement with the thread 30 on the nut 3. The lower coupling part 2, together with the tool 14, then can be axially removed by pulling the coupling part 2 out of coupling part 1. The force transfer transmitting surfaces, which extend in axial direction, in the example shown in vertical direction, prevent deformation, jamming, or clamping against each other even upon transfer of high torques. Thus, exchange of the tool 14 is simple and rapid. The coupling parts 1 and 2 can readily be made, for example by computer-controlled numerically controlled screw machines, miling machines, and the like.

The cutter 14 has an outer cylindrical element 17 which, as is customary for use with concrete or rock working, has cutting inserts, such as diamond chips and the like, bonded thereto, for example by soldering. The coupling is suitable for tools 14 of substantial diameter, for example of outer jacket diameters of the jacket 17 to about one-half meter.

Other arrangements than for connecting the coupler to the drive shaft 28 or to the driven tool 14, respectively, can be used, than the projecting bolts 4, 15 as shown. For example, rather than using a threaded bolt or stub bolt 15, a ring flange can be attached to the second part 2, for engagement against the upper flange element 16 of the cutter 14, for example by circumferentially positioned screws or the like.

The coupler can be constructed reversely with respect to the position shown, that is, the projection 20 can be placed on the first coupling part connected to the drive shaft 13 and the recess 7 formed in the second coupling part, attached to the tool 14.

Other centering arrangements than the centering recess 8 may be used. For example, in one of the coupling parts 1 or 2, a projecting centering pin may be inserted, to fit into the through-bore 10, 23, respectively, of the other coupling part. This centering pin should be so dimensioned that it fits somewhat loosely into the other coupling part. To permit conduction of cooling water, the centering pin should be formed with longitudinal grooves or, itself, can have a central bore so that it is not a solid pin but, rather, a tube which can be fluted for better transfer of liquid between the two coupling parts.

The interengaging coupling connection formed by the projection 20 fitting within the recess 7 may have different shapes than that shown, the main feature, however, being the axial movement of the parts with respect to each other upon assembly or disassembly, respectively, in which the engagement surfaces extend essentially axially. The shape may differ, for example, be polygonal.

Various changes and modifications may be made within the scope of the inventive concept.

Figure 4:
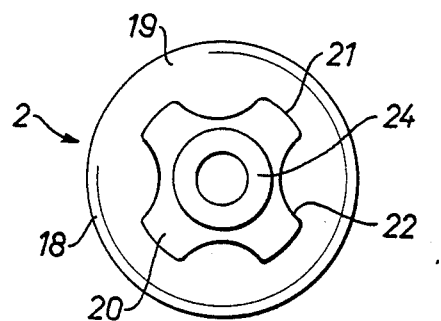
FIG. 4 is a top view of the lower coupling part.
Figure 5:
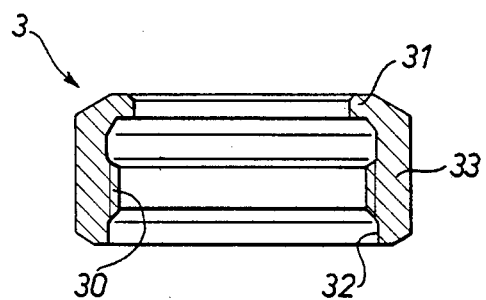
FIG. 5 is an axial sectional view of the coupling nut.

Preferably, the engagement surface a (FIG. 1) against which the surfaces 22 (FIG. 4) of the coupling part 1 fit extend at a substantial angle close to 90° with respect to a tangent at the tip portion of the respectively engaging surfaces FIGS. 1 and 4 illustrate an arrangement in which the surfaces a and 22 form an angle b of about 70° with respect to a tangent along the circle 8 at the intersection with the recesses 9 (FIG. 1); this is a suitable angle. Other shapes may be used, for example essentially radially projecting gear tooth-like or star elements projecting from the second part 2 into the recess formed in part 1, which recess is shaped to match the projections from part 2, and to receive them; the engaging surfaces extend axially with respect to the coupling parts. The angle b may vary, but preferably is not below 45°, and, for manufacturing reasons, usually would not exceed about 80°.

I claim:

1. Coupling system for selectively releasably coupling a drive shaft element (13, 28) to a concrete or boring tool element, particularly a hollow, circular boring tool element (14, 17) having
   a first coupling part (1) secured to one (13, 28) of said elements;
   a second coupling part (2) secured to the other (14, 17) of said elements; and
   means (3) for retaining said first and second coupling parts in axial engagement with each other;
   wherein
   the first coupling part (1) is formed with a recess (7) having essentially cross-positioned recess portions (9) extending inwardly from an end face (11) thereof facing the second coupling part (2);
   and wherein the second coupling part (2) is formed with a projection (20) which is essentially cross-positioned having cross legs, said cross legs terminating in circular surfaces (21) and fitting into the recess (7), while being axially separable therefrom, said projection extending from an end face (19) of the second part facing the end face (11) of the first part,
   said first and second parts including interengaging matching centering means (8, 21) formed by said circular surfaces (21) of the essentially cross-positioned projection (20), and by a circular centering recess (8) within said recess (7) and having a diameter just slightly larger than the diameter of the circle defining said circular surfaces (21) on the projections (20) to provide for centering of said parts with respect to each other regardless of the relative angular position of the cross-positioned projection (20) and the essentially cross-positioned recess portions (9) in said first part and permit relative rotation, while the parts are centered, until an engagement position between the essentially cross-positioned projection (20) and said essentially cross-positioned recess portions (9) is obtained to define a mutually axially at least approximately aligned position of said first and second parts with respect to each other, and being located at facing surfaces of said parts to provide for relative centering of said parts in advance of engagement of said essentially cross-positioned projection (20) in said recess (7) upon relative axial movement of said first and second parts.

2. The system of claim 1, wherein the retaining means (3) comprises a coupling nut for axially retaining said first and second parts in axially interengaged position; and
   one (2) of said parts is formed with an outer thread (18), and the other of said parts is formed with a shoulder (5, 6) engageable by said coupling nut (3), said coupling nut being formed with an inner thread (30) engageable with said outer thread (18), and said coupling nut being further formed with an inwardly extending ring surface (31) engageable against the shoulder (5, 6) when said parts (1) and (2) are assembled together.

3. The system of claim 1, wherein the projection (20) is formed with axially extending surfaces, and the recess (7) having said cross-positioned recess portions (9) includes axially extending recess surfaces (a), so that the torque transferring surfaces between the projection and the recess extend in axial direction.

4. The system of claim 1, wherein the retaining means (3) comprises a coupling nut for axially retaining said first and second parts in axially interengaged position.

5. The system of claim 1, wherein the recess (7) having said essentially cross-positioned recess portions (9) defines axially extending engaging surfaces;
   and wherein said projection (20) is formed with axially extending engagement surfaces fitting against said engaging surfaces in the recess, said engaging surfaces in the recess portions (9) forming an angle of up to 90° with respect to a tangent of a circle concentric with said circle defining said circular surfaces (21).

6. The system of claim 1, wherein said essentially cross-positioned recess portions are star-positioned recess portions (9);
   said projection (20) is essentially star-shaped and has radially extending legs, said legs terminating in said circular surfaces (21).

7. The system of claim 6, wherein the star-shaped legs are formed with axially extending surfaces, and the cross-positioned recess portions of the recess (7) includes axially extending recess surfaces (a) positioned for engagement by the axially extending surfaces on the legs, so that the torque transferring surfaces between the projection and the recess extend in axial direction.

8. The system of claim 1, wherein said first and second parts (1, 2) are formed with a central through-bore (10, 23) for cooling fluid;

and wherein one (2) of said parts is formed with a ring seal (24) adjacent the mouth of said through-bore for sealing the through-bore of said parts together.

9. The system of claim 1, wherein said essentially cross-positioned recess portions (9) are at least approximately semicircular and radially extend beyond the coaxial circle (21) forming said centering circle.

10. The system of claim 9, wherein four essentially semicircular portions (9) are formed in said recess (7) located in approximately cross-shaped position.

11. The system of claim 1, wherein said one part (1) is formed with a projecting bolt portion (4) extending from said one part in a direction opposite the facing end thereof, said bolt portion being threaded, for reception in a drive spindle (28);

said first part being formed with an engagement shoulder (19) from which said bolt portion projects for engagement against said drive spindle, said first part being further formed with a ring-shaped holding surface for engagement with an in-turned flange (31) of said coupling nut (3);

said second part is secured to the tool elements (14, 17) and includes a coupling bolt portion (15) projecting from the second part remote from said end face thereof, said second part further being formed with an outer thread (18) of short axial extent, and said coupling nut being formed with an inner thread (30) engageable with said outer thread;

wherein said first and second parts are formed with a central through-bore (10, 23) each for passage of a cooling fluid therethrough;

and wherein a sealing ring of essentially circular cross section is inserted in the end portion of the through-bore (23) of the second part and fitting against the through-bore (10) of the first part (1).

12. The system of claim 5, wherein said angle is between about 45° to 80°.

13. The system of claim 5, wherein said centering means are oriented with respect to an axis forming the axis of rotation of said drive shaft element (13, 28) and said tool element (14, 17), respectively.

14. The system of claim 13, wherein said angle is between about 45° to 80°.

15. Coupling system for selectively releasably coupling a drive shaft element (13, 28) to a concrete or boring tool element, particularly a hollow, circular boring tool element (14, 17) having a first coupling part (1) secured to said drive shaft element (13);

a second coupling part (2) secured to said tool element (14, 17); and a coupling nut (3) for retaining said first and second coupling parts in axial engagement with each other and in axially interengaged position, wherein the first coupling part (1) is formed with a recess (7) having essentially cross-positioned portions (12) extending inwardly from an end face (11) of said first coupling part (1) and facing the second coupling part (2);

wherein the second coupling part (2) is formed with a projection (20) of essentially star shape having radially extending legs, the legs terminating in circular surfaces (21) and the portions of said projection between said legs being rounded, said projection matching the cross-sectional shape of the recess (7) and fitting therein, while being axially separable therefrom, said projection extending from an end face (19) of the second part (2) and facing the end face (11) of the first part;

centering means are provided to define a mutually axially at least approximately aligned position of said first and second parts with respect to each other to provide for relative centering of said parts in advance of engagement of said essentially cross-shaped projection (20) in said recess (7) upon relative axial movement of said first and second parts and permit relative rotation of said parts while said parts are being centered until an engagement position between said projection and said recess is obtained;

said second coupling part (2) is formed with an outer thread (18) and said first coupling part (1) is formed with a shoulder (5, 6) engageable by said coupling nut (3), said coupling nut being formed with an inner thread (30) engageable with said outer thread (18), and said coupling nut being further formed with an inwardly extending ring surface (31) engageable against the shoulder (5, 6) when said parts (1) and (2) are assembled together;

and wherein the star-shaped radially extending legs of said projection (20) and said recess (7) formed with said essentially cross-shaped portions (12) includes axially extending recess surfaces (a) positioned for engagement by the axially extending surfaces on the legs, so that the torque transferring surfaces between the projection and the recess extend in axial direction.

16. The system of claim 15, wherein said first and second parts (1, 2) are formed with axial openings (10, 23) for axial passage of cooling fluid through the coupling.

* * * * *